United States Patent Office 3,123,621
Patented Mar. 3, 1964

3,123,621
PREPARATION OF ARYL AZIDES AND ARYL DIAZIDES BY THE REACTION OF DIAZONIUMFLUOROBORATE SALTS WITH ALKALI AZIDES
David L. Herring, Riverside, Calif., assignor to the United States of America as represented by the Secretary of the Navy
No Drawing. Filed Apr. 19, 1962, Ser. No. 188,905
2 Claims. (Cl. 260—349)
(Granted under Title 35, U.S. Code (1952), sec. 266)

The invention herein described may be manufactured and used by or for the Government of the United States of America for governmental purposes without the payment of any royalties thereon or therefor.

The present invention relates to aryl azides and aryl diazides and more particularly to a new and improved method for the synthesis of aryl azides and aryl diazides.

The old method for producing these compounds is that of Griess Ber., 21, 558 (1888), where 1,4-diazidobenzene was prepared by converting p-phenylenediamine to acetyl p-aminodiabobenzene perbromide. This compound was treated with $NH_3$ which gave p-aminoazidobenzene. The process was repeated finally yielding the diazide. This old method is very tedious, time-consuming and the yield of the aryl diazide is low.

The advantages of the new method for synthesizing aryl azides and aryl diazides are: the diazoniumfluoroborate salts produced are stable compounds which can readily be purified, whereas most diazonium halides formed in the usual diazotization reaction are unstable which makes any attempt to purify the salt difficult and hazardous; and the new method, described by the reactions herein, is a rapid, inexpensive general method for synthesizing aryl azides in high yield from readily available materials. Aryl azides and aryl diazides are valuable intermediates used in the formation of polymeric materials which are useful as dielectric materials and which may also be useful semi-conductor materials, as disclosed in my copending application Serial No. 188,907 mentioned below.

The present invention relates to copending application Serial No. 188,906, filed April 19, 1962, now U.S. Patent No. 3,064,055, for 1,4 Bis (Diphenylphosphino) Benzene, and copending application Serial No. 188,907, filed April 19, 1962, for Preparation of Polymeric Materials by the Reaction of Aryldiphosphines With Aryl Diazides.

It is an object of the invention therefore to provide a new and improved method for the synthesis of aryl azides and aryl diazides.

It is another object of the invention to provide the synthesizing of aryl azides and aryl diazides by the reaction of diazoniumfluoroborate salts with alkali azides.

Other objects and many of the attendant advantages of this invention will become readily appreciated as the same becomes better understood by reference to the following detailed description.

The new method of the present invention is described in the following procedure:

To 14.2 g. of p-phenylenediamine dissolved in 266 ml. of warm $H_2O$ in a 1 liter flask was added 19.2 g. of $NaNO_2$. The resulting solution was cooled to 20° C. and then added dropwise over a 2 hour period to a rapidly stirred solution maintained at −20 to −18° C., containing 160 ml. of conc. HCl and 38.4 g. of $NaBF_4$ dissolved in 160 ml. of $H_2O$. $F_4BN_2$—$C_6H_4$—$N_2BF_4$ which formed was removed by filtration washed with 25 ml. of $H_2O$, 35 ml. of ethyl ether and then air dried. The dry salt weighed 23.5 g. (59.3%).

To 5.2 g. of $NaN_3$ dissolved in 400 ml. of ice-cold $H_2O$, 10 g. of $F_4BN_2$—$C_6H_4$—$N_2BF_4$ was added over a 30 min. period. Nitrogen was evolved during the course of the reaction. The precipitate which formed was collected. Then, by the process of recrystallization from ether using 0.3 g. of charcoal to remove impurities, 3.1 g. (59%) of a cream-colored crystalline product 1,4 diazidobenzene was isolated, melting point 81.2–82.2° C. The infrared spectra of the compound showed a major absorption peak at 4.75 microns characteristic of azides. 1,4 diazidobenzene is light sensitive and darkens to a brown colored material on exposure to ultraviolet radiation. Although the compound detonates on sudden heating, no explosions were observed during the many experiments conducted with the diazide. As an alternate method for purifying 1,4 diazidobenzene, the crude material was sublimed in vacuum yielding glistening crystals of the pure compound.

Analysis.—Calcd. for $C_6H_4N_6$: N, 52.5. Found: N, 52.9.

This method of synthesis is a general method and can be used to prepare phenyl azide and other mono azides as well as aryl diazides such as

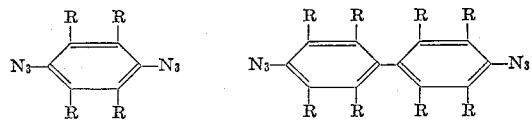

where R=H, alkyl, aryl or other substituents unaffected by the process.

The new method described by the reactions:

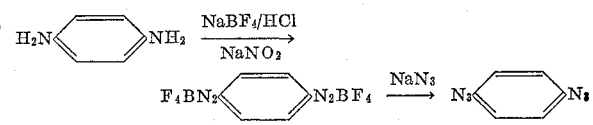

is a rapid, inexpensive general method for synthesizing aryl azides in high yield from readily available materials.

Obviously many modifications and variations of the present invention are possible in the light of the above teachings. It is therefore to be understood that within the scope of the appended claims the invention may be practiced otherwise than as specifically described.

What is claimed is:

1. The method for synthesizing aryl azides and aryl diazides by reacting an aromatic amine with an alkali, metal nitrite and an alkali metal fluoroborate at about −20° C. in an aqueous solution of hydrochloric acid to form the intermediate diazonium fluoroborate salt which subsequently is reacted with an alkali metal azide in aqueous solution cooled to about 0° C.

2. The method for synthesizing the compound, p-phenylene, diazide, by reacting p-phenylenediamine in an aqueous solution of hydrochloric acid with sodium nitrite for about two hours followed by treatment with sodium fluoroborate at −20° C., and subsequent reaction of the resultant bis phenylene diazoniumfluoroborate salt with sodium azide.

References Cited in the file of this patent

Noelting et al.: "Berichte," vol. 26, pp. 86–87 (1893).
Boyer et al.: "Chemical Reviews," vol. 54, p. 17 (1954).
Huisgen et al.: "Ang. Chem.," vol. 68, pp. 705–6 (1956).